United States Patent
Lefebvre et al.

(10) Patent No.: US 10,393,027 B2
(45) Date of Patent: Aug. 27, 2019

(54) GAS TURBINE ENGINE SHAFT ARCHITECTURE AND ASSOCIATED METHOD OF DISASSEMBLY

(71) Applicant: PRATT & WHITNEY CANADA CORP., Longueuil (CA)

(72) Inventors: Guy Lefebvre, St-Bruno-de-Montarville (CA); John Pietrobon, Outremont (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 395 days.

(21) Appl. No.: 15/407,423

(22) Filed: Jan. 17, 2017

(65) Prior Publication Data

US 2018/0023471 A1    Jan. 25, 2018

Related U.S. Application Data

(60) Provisional application No. 62/363,955, filed on Jul. 19, 2016, provisional application No. 62/363,956, (Continued)

(51) Int. Cl.
  *F01D 5/02*        (2006.01)
  *F02C 7/36*        (2006.01)
  (Continued)

(52) U.S. Cl.
  CPC ............. *F02C 7/36* (2013.01); *B64D 27/10* (2013.01); *B64D 35/04* (2013.01); *F01D 5/026* (2013.01);
  (Continued)

(58) Field of Classification Search
  CPC .. F02C 3/08; F02C 3/107; F02C 6/206; F02C 7/36; B64D 35/00; B64D 35/02;
  (Continued)

(56) References Cited

U.S. PATENT DOCUMENTS 2,548,975 A    4/1951    Hawthorne
2,747,367 A    5/1956    Savin
(Continued)

FOREIGN PATENT DOCUMENTS

CA    2562290 C    10/2013
CA    2970386      1/2018
(Continued)

OTHER PUBLICATIONS

United Training Corp., PT6 Descriptive Course and Guide to Troubleshooting, Dec. 2016, Pub: United Training Corp., pp. 1-6. (Year: 2016).*

(Continued)

*Primary Examiner* — Gerald L Sung
*Assistant Examiner* — Marc J Amar
(74) *Attorney, Agent, or Firm* — Norton Rose Fulbright Canada LLP

(57) ABSTRACT

A multi-spool gas turbine engine comprises a low pressure (LP) spool and a high pressure (HP) spool independently rotatable about a central axis. The LP pressure spool has an LP compressor and an LP turbine. The HP spool has an HP turbine and an HP compressor. An accessory gear box (AGB) is drivingly connected to the HP spool. The LP compressor is disposed axially between the HP compressor and the AGB. A gear train drivingly couples the LP compressor to the LP turbine. The gear train is integrated to the AGB.

19 Claims, 3 Drawing Sheets

Related U.S. Application Data filed on Jul. 19, 2016, provisional application No. 62/363,947, filed on Jul. 19, 2016, provisional application No. 62/363,949, filed on Jul. 19, 2016, provisional application No. 62/363,952, filed on Jul. 19, 2016.

(51) Int. Cl.

| | | |
|---|---|---|
| *B64D 35/04* | (2006.01) | |
| *F02C 3/08* | (2006.01) | |
| *F02C 3/113* | (2006.01) | |
| *B64D 27/10* | (2006.01) | |
| *F01D 15/12* | (2006.01) | |
| *F02C 3/10* | (2006.01) | |
| *F02K 3/06* | (2006.01) | |
| *F01D 25/18* | (2006.01) | |
| *F02C 7/32* | (2006.01) | |
| *F16H 57/04* | (2010.01) | |
| *F02C 3/107* | (2006.01) | |
| *F02C 3/14* | (2006.01) | |
| *F02C 6/20* | (2006.01) | |

(52) U.S. Cl.
CPC ............ *F01D 15/12* (2013.01); *F01D 25/18* (2013.01); *F02C 3/08* (2013.01); *F02C 3/10* (2013.01); *F02C 3/107* (2013.01); *F02C 3/113* (2013.01); *F02C 3/145* (2013.01); *F02C 6/206* (2013.01); *F02C 7/32* (2013.01); *F02K 3/06* (2013.01); *F16H 57/0495* (2013.01); *F05D 2220/32* (2013.01); *F05D 2220/323* (2013.01); *F05D 2220/324* (2013.01); *F05D 2220/329* (2013.01); *F05D 2230/70* (2013.01); *F05D 2230/72* (2013.01); *F05D 2240/61* (2013.01); *F05D 2250/36* (2013.01); *F05D 2260/31* (2013.01); *F05D 2260/36* (2013.01); *F05D 2260/40* (2013.01); *F05D 2260/4031* (2013.01); *F05D 2260/40311* (2013.01); *F05D 2260/98* (2013.01); *Y02T 50/671* (2013.01)

(58) Field of Classification Search
CPC ........ B64D 35/04; B64D 35/06; B64D 35/08; F01D 5/026; F05D 2230/60; F05D 2230/61; F05D 2230/64; F05D 2230/642; F05D 2230/644; F05D 2230/68; F05D 2230/70; F05D 2230/72
See application file for complete search history.

(56) References Cited

U.S. PATENT DOCUMENTS

| | | | |
|---|---|---|---|
| 2,929,207 A | 3/1960 | Peterson | |
| 2,955,424 A | 10/1960 | Hryniszak | |
| 2,984,977 A | 5/1961 | Embree | |
| 3,152,443 A | 10/1964 | Newland | |
| 3,170,292 A | 2/1965 | Howes | |
| 3,204,406 A | 9/1965 | Howes | |
| 3,209,536 A | 10/1965 | Howes | |
| 3,255,825 A | 6/1966 | Mouille et al. | |
| 3,488,947 A | 1/1970 | Miller | |
| 3,529,419 A | 9/1970 | Reed | |
| 3,762,161 A | 10/1973 | Pennig | |
| 3,874,811 A | 4/1975 | Dennison | |
| 4,030,288 A * | 6/1977 | Davis | F01D 9/04 60/39.511 |
| 4,141,212 A | 2/1979 | Koschier | |
| 4,251,987 A | 2/1981 | Adamson | |
| 4,531,694 A | 7/1985 | Soloy | |
| 4,611,464 A * | 9/1986 | Hetzer | F02C 7/20 415/189 |
| 4,685,286 A | 8/1987 | Hetzer et al. | |
| 4,744,214 A * | 5/1988 | Monsarrat | F02K 3/06 415/143 |
| 4,765,135 A * | 8/1988 | Lardellier | F01D 5/03 416/127 |
| 4,815,282 A | 3/1989 | Wilkinson et al. | |
| 4,817,382 A | 4/1989 | Rudolph et al. | |
| 4,934,140 A * | 6/1990 | Dennison | F02C 7/20 244/54 |
| 5,119,624 A | 6/1992 | McKenna | |
| 5,159,808 A | 11/1992 | Kast | |
| 5,161,364 A | 11/1992 | Bruun | |
| 5,220,784 A * | 6/1993 | Wilcox | B63H 21/16 416/198 A |
| 5,309,708 A | 5/1994 | Stewart | |
| 5,473,883 A * | 12/1995 | Naudet | F01D 5/06 60/791 |
| 6,041,589 A | 3/2000 | Giffin, III et al. | |
| 6,082,967 A | 7/2000 | Loisy | |
| 6,247,668 B1 | 6/2001 | Reysa | |
| 6,606,863 B2 * | 8/2003 | Napier | F01D 5/066 415/216.1 |
| 6,735,954 B2 | 5/2004 | MacFarlane et al. | |
| 6,855,089 B2 | 2/2005 | Poulin | |
| 6,865,891 B2 | 3/2005 | Walsh et al. | |
| 6,895,741 B2 | 5/2005 | Rago et al. | |
| 6,901,759 B2 | 6/2005 | Frutschi | |
| 7,055,303 B2 | 6/2006 | Macfarlane et al. | |
| 7,144,349 B2 | 12/2006 | Mitrovic | |
| 7,168,913 B2 | 1/2007 | Lardellier | |
| 7,500,365 B2 | 3/2009 | Suciu et al. | |
| 7,552,591 B2 | 6/2009 | Bart et al. | |
| 7,690,185 B2 | 4/2010 | Linet et al. | |
| 7,698,884 B2 | 4/2010 | Maguire et al. | |
| 7,707,909 B2 | 5/2010 | Linet et al. | |
| 7,758,302 B2 | 7/2010 | Linet et al. | |
| 7,762,084 B2 | 7/2010 | Martis | |
| 8,176,725 B2 | 5/2012 | Norris et al. | |
| 8,209,952 B2 | 7/2012 | Ress, Jr. | |
| 8,220,245 B1 | 7/2012 | Papandreas | |
| 8,350,398 B2 | 1/2013 | Butt | |
| 8,459,038 B1 | 6/2013 | Lickfold et al. | |
| 8,464,511 B1 | 6/2013 | Ribarov et al. | |
| 8,500,583 B2 | 8/2013 | Goi et al. | |
| 8,516,789 B2 | 8/2013 | Kupratis | |
| 8,568,089 B2 | 10/2013 | Lemmers, Jr. et al. | |
| 8,621,871 B2 | 1/2014 | McCune et al. | |
| 8,689,538 B2 * | 4/2014 | Sankrithi | B64C 11/48 60/226.1 |
| 8,794,922 B2 | 8/2014 | Bart et al. | |
| 8,845,292 B2 * | 9/2014 | Lafont | B64C 11/04 416/204 R |
| 8,853,878 B1 | 10/2014 | White | |
| 9,062,611 B2 | 6/2015 | Sheridan | |
| 9,126,691 B2 | 9/2015 | Cloft | |
| 9,145,834 B2 | 9/2015 | Frost et al. | |
| 9,239,004 B2 | 1/2016 | Kupratis | |
| 9,297,305 B2 | 3/2016 | Drachsler et al. | |
| 9,322,341 B2 | 4/2016 | Belleville | |
| 9,328,667 B2 | 5/2016 | MacFarlane | |
| 9,341,121 B2 | 5/2016 | Kupratis | |
| 9,353,848 B2 | 5/2016 | Blewett et al. | |
| 9,512,784 B2 | 12/2016 | Morgan et al. | |
| 9,719,465 B2 | 8/2017 | Suciu | |
| 9,745,860 B1 | 8/2017 | Raskin | |
| 9,752,500 B2 | 9/2017 | Ullyott et al. | |
| 9,752,610 B2 * | 9/2017 | Rousseau | F16B 39/10 |
| 9,784,182 B2 | 10/2017 | Dhanuka | |
| 9,819,292 B2 | 11/2017 | Thatcher | |
| 9,828,911 B2 | 11/2017 | Burghardt | |
| 9,890,704 B2 | 2/2018 | Speak et al. | |
| 9,926,849 B2 | 3/2018 | Frost et al. | |
| 9,932,858 B2 | 4/2018 | Miller | |
| 10,054,001 B2 | 8/2018 | Beutin et al. | |
| 10,094,295 B2 | 10/2018 | Ullyott et al. | |
| 10,132,198 B2 * | 11/2018 | Baba | F01D 25/285 |
| 2003/0051483 A1 * | 3/2003 | Napier | F01D 5/066 60/792 |
| 2006/0137355 A1 | 6/2006 | Welch et al. | |

(56) References Cited

U.S. PATENT DOCUMENTS

| | | |
|---|---|---|
| 2008/0081733 A1 | 4/2008 | Hattenbach |
| 2008/0138195 A1 | 6/2008 | Kern |
| 2008/0148881 A1 | 6/2008 | Moniz et al. |
| 2009/0188334 A1 | 7/2009 | Merry |
| 2009/0288421 A1 | 11/2009 | Zeiner |
| 2009/0322088 A1 | 12/2009 | Dooley |
| 2010/0164234 A1 | 7/2010 | Bowman |
| 2010/0180568 A1 | 7/2010 | Sachs |
| 2010/0281875 A1 | 11/2010 | Price |
| 2011/0056183 A1* | 3/2011 | Sankrithi .............. B64C 11/48 60/204 |
| 2011/0056208 A1 | 3/2011 | Norris |
| 2011/0171030 A1 | 7/2011 | Swift |
| 2011/0284328 A1 | 11/2011 | Brandt |
| 2012/0121417 A1* | 5/2012 | Lafont .............. B64C 11/04 416/142 |
| 2013/0031912 A1 | 2/2013 | Finney |
| 2013/0056982 A1 | 3/2013 | Gozdawa |
| 2013/0139518 A1 | 6/2013 | Morgan |
| 2013/0186058 A1 | 7/2013 | Sheridan |
| 2013/0255224 A1 | 10/2013 | Kupratis |
| 2014/0069107 A1 | 3/2014 | Macfarlane |
| 2014/0130352 A1 | 5/2014 | Buldtmann et al. |
| 2014/0250862 A1 | 9/2014 | Suciu et al. |
| 2014/0252160 A1 | 9/2014 | Suciu et al. |
| 2014/0260295 A1 | 9/2014 | Ullyott |
| 2014/0290265 A1 | 10/2014 | Ullyott et al. |
| 2015/0013307 A1 | 1/2015 | Burghardt |
| 2015/0150401 A1 | 6/2015 | Bennett |
| 2015/0292544 A1* | 10/2015 | Rousseau .............. F16B 39/10 411/204 |
| 2015/0337738 A1 | 11/2015 | Suciu |
| 2015/0369123 A1 | 12/2015 | Hanrahan |
| 2015/0377125 A1 | 12/2015 | Kupratis |
| 2016/0040601 A1 | 2/2016 | Frost et al. |
| 2016/0090871 A1 | 3/2016 | Olsen |
| 2016/0169118 A1 | 6/2016 | Duong |
| 2016/0201490 A1 | 7/2016 | Scott |
| 2016/0215694 A1 | 7/2016 | Brostmeyer |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0305261 A1 | 10/2016 | Orosa |
| 2016/0319845 A1 | 11/2016 | Molnar |
| 2016/0333791 A1 | 11/2016 | Snyder et al. |
| 2016/0363055 A1 | 12/2016 | Edwards |
| 2017/0108084 A1 | 4/2017 | Chmylkowski |
| 2017/0122122 A1 | 5/2017 | Lepretre |
| 2017/0191381 A1* | 7/2017 | Baba .............. F01D 25/285 |
| 2017/0211477 A1 | 7/2017 | Menheere |
| 2017/0211484 A1 | 7/2017 | Sheridan |
| 2017/0191413 A1 | 8/2017 | Raskin |
| 2017/0306841 A1 | 10/2017 | Skertic |
| 2017/0314469 A1 | 11/2017 | Roever |
| 2017/0314474 A1 | 11/2017 | Wotzak |
| 2017/0327241 A1 | 11/2017 | Mitrovic |
| 2017/0356347 A1 | 12/2017 | Scothern et al. |
| 2017/0356452 A1 | 12/2017 | Mastro |
| 2018/0023481 A1 | 1/2018 | Lefebvre |
| 2018/0023482 A1 | 1/2018 | Lefebvre |
| 2018/0045068 A1 | 2/2018 | Brinson et al. |
| 2018/0058330 A1 | 3/2018 | Munevar |
| 2018/0073428 A1 | 3/2018 | Morgan |
| 2018/0073429 A1 | 3/2018 | Dubreuil |
| 2018/0073438 A1 | 3/2018 | Durocher et al. |
| 2018/0135522 A1 | 5/2018 | Mitrovic et al. |
| 2018/0149091 A1 | 5/2018 | Howell et al. |
| 2018/0163640 A1 | 6/2018 | Dubreuil |
| 2018/0171815 A1 | 6/2018 | Suciu et al. |
| 2018/0172012 A1 | 6/2018 | Plante |
| 2018/0202310 A1 | 7/2018 | Suciu et al. |
| 2018/0202368 A1 | 7/2018 | Suciu et al. |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 B1 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 B1 | 5/2012 |
| EP | 2728140 | 5/2014 |
| EP | 3043056 | 7/2016 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 1102591 | 2/1968 |
| WO | WO95/02120 A1 | 1/1995 |
| WO | 2005/061873 | 7/2005 |
| WO | WO200845068 | 4/2008 |
| WO | WO201533336 | 3/2015 |
| WO | 20150122948 | 8/2015 |
| WO | WO2015122948 | 8/2015 |
| WO | WO2017/198999 | 11/2017 |

OTHER PUBLICATIONS

Flight International, PT6: Turboprop Phenomenon, Jan. 31-Feb. 6, 1990, Reed Business Publishing Ltd, pp. 32-36. (Year: 1990).*

Guy Norris, GE Takes on PT6 Engine With Advanced Turboprop, Nov. 17, 2015, Aviation Week Intelligence Network, pp. 1-3. (Year: 2015).*

European Search Report dated Mar. 19, 2018 in related EP application No. 17182087.1.

European Search Report dated Mar. 21, 2018 in related EP application No. 17182094.7.

European Search Report dated Apr. 6, 2018 in related EP application No. 17193893.9.

European Search Report dated Nov. 30, 2017 in related EP application No. 17182102.8.

European Search Report dated Dec. 12, 2017 in counterpart EP application No. 17182076.4.

European Search Report dated Dec. 12, 2017 in related EP application No. 17182096.2.

European Search Report dated Jan. 31, 2018 in related EP application No. 17185796.4.

European Search Report dated May 25, 2018 in related EP application No. 17191309.8.

European Search Report dated May 25, 2018 in related EP application No. 171862493.

European Search Report dated Jul. 2, 2018 in relating EP application No. 18154161.6.

A New Approach to Turboshaft Engine Growth, M. A. Compagnon, General Electric Company, Lynn, Massachusetts pp. 80-41-1 to 80-41-6, May 13, 1980.

U.S. Appl. No. 15/384,959, filed Dec. 20, 2016.

* cited by examiner

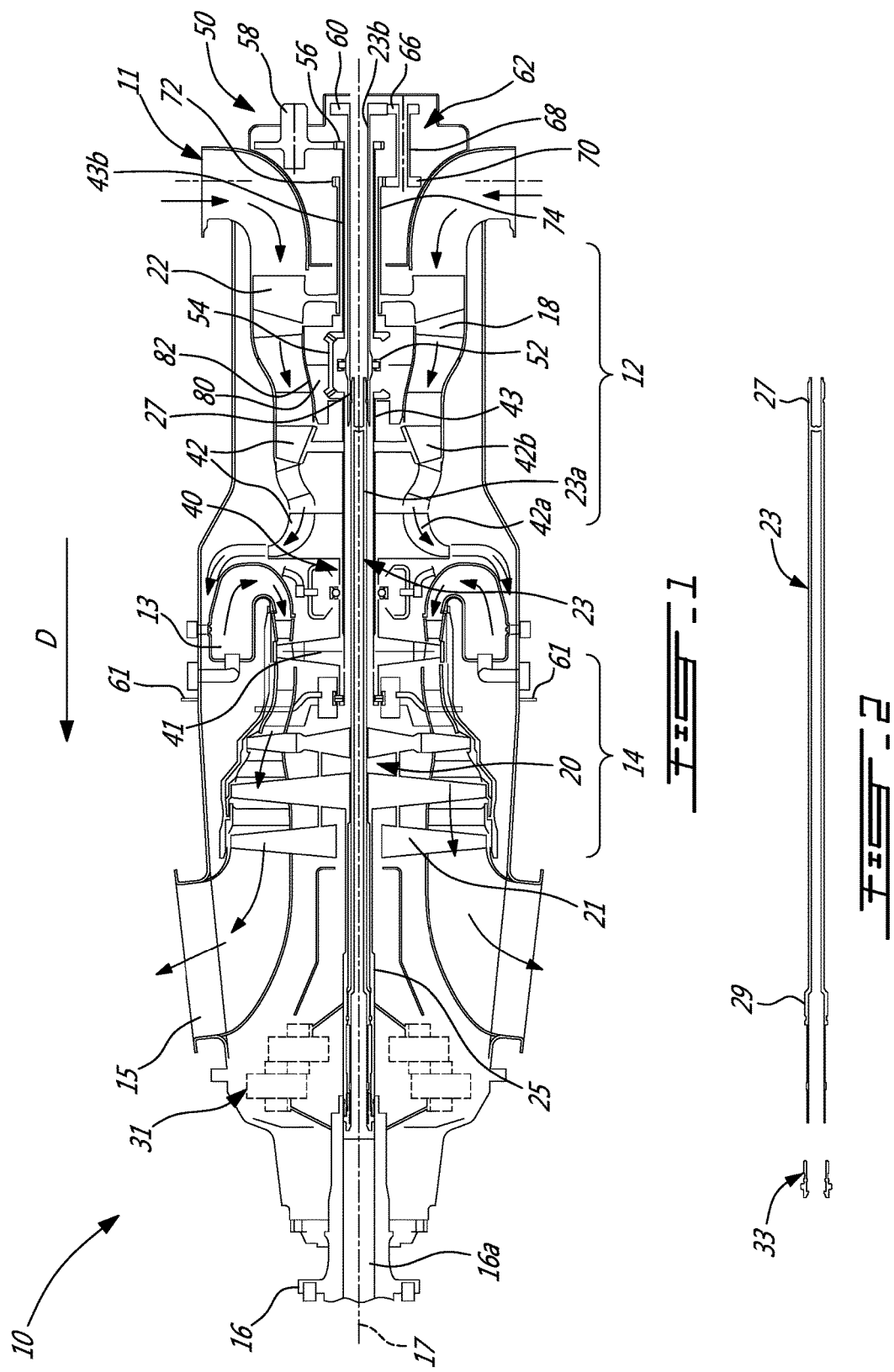

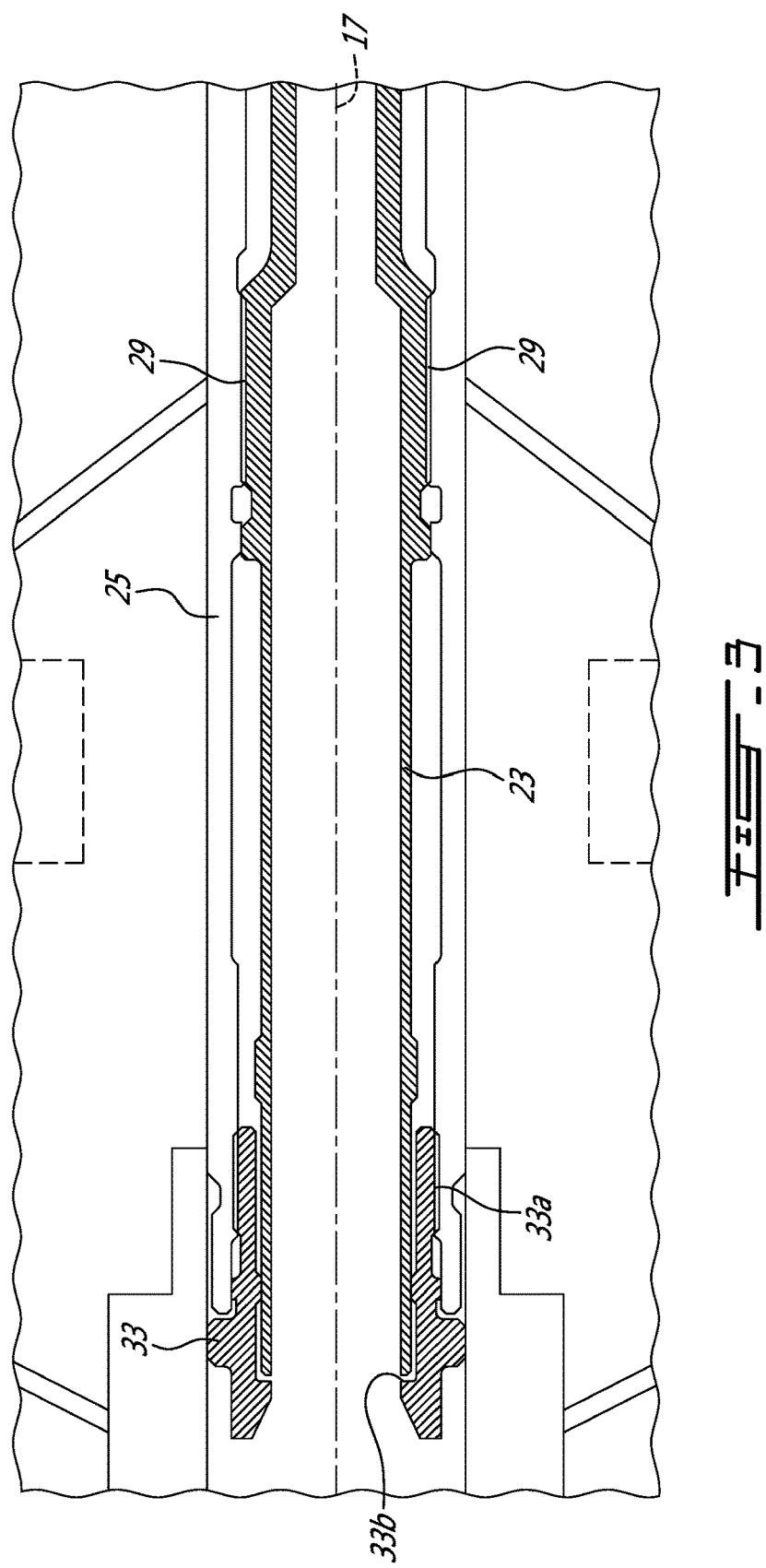

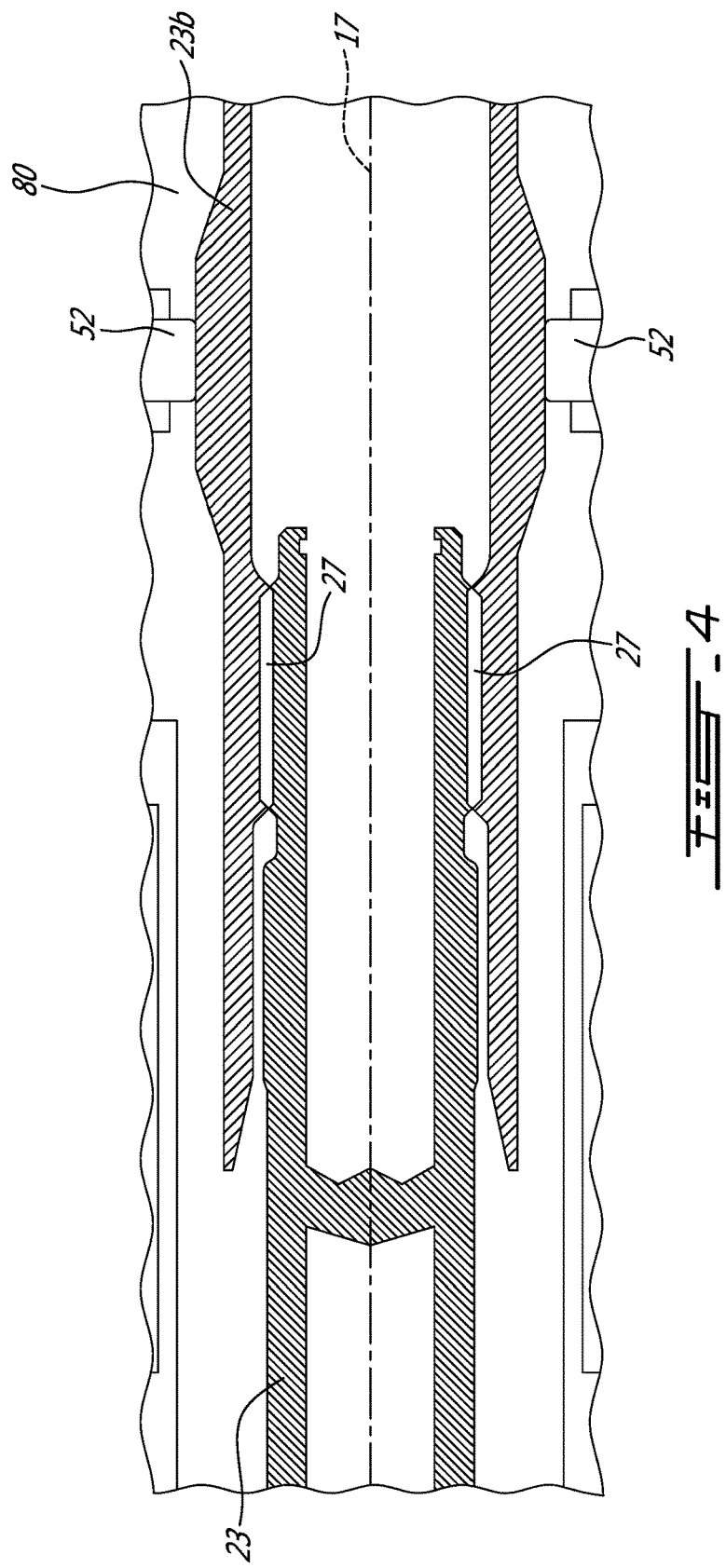

US 10,393,027 B2

GAS TURBINE ENGINE SHAFT ARCHITECTURE AND ASSOCIATED METHOD OF DISASSEMBLY

CROSS-REFERENCE TO RELATED APPLICATIONS

This application claims priority from U.S. provisional patent application Nos. 62/363,956, filed Jul. 19, 2016, 62/363,955, filed Jul. 19, 2016; 62/363,952 filed Jul. 19, 2016; 62/363,949 filed Jul. 19, 2016; 62/363,947 filed Jul. 19, 2016 and U.S. application Ser. No. 15/266,321 filed Sep. 15, 2016, the entire contents of each of which are incorporated by reference herein.

TECHNICAL FIELD

The application relates generally to gas turbine engines and, more particularly, to a shaft architecture and an associated method of disassembly.

BACKGROUND OF THE ART

Engine component inspections, such as hot section inspections (HSI), are conducted at periodic intervals. Such inspections may be difficult and time consuming if the engine architecture does facilitate disassembly.

There is, thus, a need for improvement.

SUMMARY

In one aspect, there is provided a boosted reverse flow gas turbine engine comprising: a low pressure (LP) spool and a high pressure (HP) spool rotatable independently of one another about an engine axis; the LP spool comprising an LP turbine, an LP compressor disposed aft of the LP turbine relative to a direction of travel of the engine, an LP compressor drive shaft drivingly connecting the LP turbine to the LP compressor, and a hollow LP turbine shaft projecting axially forward from the LP turbine and drivingly connected thereto for driving a rotatable load; the LP compressor drive shaft being coaxial to the LP turbine shaft and axially removable through the hollow LP turbine shaft.

In another aspect, there is provided a turboprop engine comprising: a propeller shaft rotatable about an engine axis; a low pressure (LP) turbine shaft rotatable about the engine axis and drivingly coupled to the propeller shaft; an LP turbine drivingly connected to the LP turbine shaft; an LP compressor drive shaft rotatable about the engine axis and drivingly coupled to the LP turbine; and an LP compressor drivingly coupled to the LP compressor drive shaft, the LP turbine disposed axially between the propeller shaft and the LP compressor; the LP compressor drive shaft being removable from the engine through a central passage extending axially through the propeller shaft and the LP turbine shaft.

In a further aspect, there is provided a method of removing a shaft from a turboprop engine having a low pressure (LP) compressor drivingly coupled to an LP turbine via an LP compressor drive shaft, the LP turbine drivingly coupled to a propeller shaft of a propeller, the method comprising: removing the propeller from the propeller shaft, the propeller shaft defining an axially extending passage providing access to the LP compressor drive shaft, axially unlocking the LP compressor drive shaft, and axially extracting the low pressure compressor drive shaft through the axially extending passage of the propeller shaft.

DESCRIPTION OF THE DRAWINGS

Reference is now made to the accompanying figures in which:

FIG. 1 is a schematic cross-section view of a boosted reverse flow engine;

FIG. 2 is a longitudinal cross-section view of a removable low pressure (LP) compressor drive shaft of the engine shown in FIG. 1;

FIG. 3 is an enlarged cross-section view illustrating how the LP compressor drive shaft is drivingly coupled via axially extending splines to an LP turbine shaft drivingly connected to an LP turbine of the engine shown in FIG. 1; and FIG. 4 is an enlarged cross-section view illustrating a spline connection for drivingly coupling the LP compressor drive shaft to an LP compressor via a boost gear train shown at the right hand side of FIG. 1.

DETAILED DESCRIPTION

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the engine 10. The engine 10 further has a drive output shaft 16 having a front end configured to drive a rotatable load (not shown). The rotatable load can, for instance, take the form of a propeller or a rotor, such as a helicopter main rotor. Depending on the intended use, the engine 10 can be configured as a turboprop engine or a turboshaft engine. FIG. 1 illustrates a turboprop configuration. In FIG. 1, the drive output shaft is, thus, a propeller shaft. The gas turbine engine 10 has a centerline or engine axis 17 about which the compressor and turbine rotors rotate.

The gas turbine engine 10 has an axially extending central core which defines a gaspath 18 through which gases flow, as depicted by flow arrows in FIG. 1. The exemplary embodiment shown in FIG. 1 is a "reverse-flow" engine because gases flow through the gaspath 18 from the air inlet 11 at a rear portion thereof, to the exhaust outlet 15 at a front portion thereof. This is in contrast to "through-flow" gas turbine engines in which gases flow through the core of the engine from a front portion to a rear portion. The direction of the flow of gases through the gaspath 18 of the engine 10 disclosed herein can be better appreciated by considering that the gases flow through the gaspath 18 in the same direction D as the one along which an aircraft engine travels during flight. Stated differently, in the non-limitative example shown in FIG. 1, gases flow through the engine 10 from a rear end thereof towards the propeller shaft 16.

It will thus be appreciated that the expressions "forward" and "aft" used herein refer to the relative disposition of components of the engine 10, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to output shaft 16 (e.g. closer to the propeller in a turboprop application). Similarly, a component of the engine 10 that is "aft" of another component is arranged within the engine 10 such that it is further away from the output shaft 16.

Still referring to FIG. 1, the engine 10 has multiple spools which perform compression to pressurize the air received through the air inlet 11, and which extract energy from the combustion gases before they exit the gaspath 18 via the exhaust outlet 15. More particularly, the illustrated embodiment comprises a low pressure (LP) spool 20 and a high pressure (HP) spool 40 mounted for rotation about the engine axis 17. The LP and HP spools 20, 40 are independently rotatable about the axis 17. The term "spool" is herein intended to broadly refer to drivingly interconnected rotors such as turbine and compressor rotors and is, thus, not limited to a single shaft compressor/rotor assembly. For instance, as will be seen herein after, it is intended to include a low pressure turbine which is drivingly connected to a geared low pressure compressor.

The LP spool 20 includes at least one component to compress the air that is part of the compressor section 12, and at least one component to extract energy from the combustion gases that is part of the turbine section 14. More particularly, the LP spool 20 has an LP turbine 21, also known as a power turbine, which may include different number of stages (three stages in the illustrated embodiment), and which drives an LP compressor 22 (also referred to as a boost). The LP turbine 21 drives the LP compressor 22, thereby causing the LP compressor 22 to pressurize incoming air from the air inlet 11. The LP compressor 22 is disposed just forward of the air inlet 11. Both the LP turbine 21 and the LP compressor 22 are disposed along the engine axis 17. In the depicted embodiment, both the LP turbine 21 and the LP compressor 22 include rotatable components having an axis of rotation that is coaxial with the engine axis 17. It is understood that they may include one or more stages depending upon the desired engine thermodynamic cycle.

For a reverse flow engine, the LP turbine 21 is forward of the LP compressor 22. The LP turbine 21 is also aft of the exhaust outlet 15. The LP compressor 22 is forward of the air inlet 11. This arrangement of the LP turbine 21 and the LP compressor 22 provides for a reverse-flow engine 10 that has one or more LP compressor stages located at the rear of the engine 10, and which are driven by one or more low pressure turbine stages located at the front of the engine 10.

The LP spool 20 further comprises an LP compressor drive shaft 23 coaxial with engine axis 17. The LP turbine 21 is drivingly coupled to the LP compressor drive shaft 23. The LP compressor drive shaft 23 allows the LP turbine 21 to drive the LP compressor 22 during operation of the engine 10. As will be discussed in greater details hereinbelow, the LP compressor drive shaft 23 may be drivingly coupled to the LP compressor 22 via a gear train 62, thereby allowing the LP compressor 22 to run at a different rotational speed from the LP turbine 21. This can provide more flexibility in the selection of design points for the LP compressor 22 while at the same time allowing to drivingly connect an axially mounted accessory gear box (AGB) 50 to the HP spool 40 centrally through the LP compressor 22, thereby minimizing the engine envelope in a direction radial from the engine axis 17 as compared to conventional boosted engine with side-mounted AGBs (AGBs mounted on a radially outer surface of the engine envelope) driven via a tower shaft.

Still referring to FIG. 1, it can be appreciated that a hollow power turbine or LP turbine shaft 25 extends forwardly from the LP turbine 21 for driving the propeller shaft 16. The LP turbine shaft 25 is coaxial to the engine axis 17 and is drivingly connected to the propeller shaft 16 via a suitable reduction gear box (RGB) 31. A rotatable load, a propeller (not shown) according to the illustrated example, is connectable to a front end of the propeller shaft 16. In this way, the LP turbine 21 can be used to drive the propeller at a reduced speed relative to the speed of the LP turbine 21. In such a configuration, during operation of the engine 10, the LP turbine 21 drives the rotatable load such that a rotational drive produced by the LP turbine 21 is transferred to the rotatable load via the LP turbine shaft 25, the RGB 31 and output shaft 16 coming out forwardly from the RGB 31.

The RGB 31 processes and outputs the rotational drive transferred thereto from the LP turbine 21 via the LP turbine shaft 25 through known gear reduction techniques. The RGB 31 allows for the load (e.g. the propeller according to the illustrated turboprop example) to be driven at its optimal rotational speed, which is different from the rotational speed of the LP turbine 21. The RGB 31 is axially mounted at the front end of the engine 10. The RGB 31 has an input and an output axis parallel (coaxial in the illustrated embodiment) to the engine axis 17.

In an alternate embodiment where the engine 10 is a turboshaft, the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the RGB 31 may be omitted such that the output of the engine 10 is provided directly by the LP turbine shaft 25.

The LP compressor drive shaft 23 and the LP turbine shaft 25 (extending respectively aft and forward of the LP turbine 21) provide the engine 10 with bidirectional drive. Modularity criteria for gas turbine engines motivates the use of distinct shafts in opposed axial directions from the LP turbine 21. The LP compressor drive shaft 23 and the LP turbine shaft 25 may be directly or indirectly connected together. Whether directly or indirectly connected the LP compressor drive shaft 23 and the LP turbine shaft 25 provide rotational outputs at opposed end of the engine. The LP turbine shaft 25 provides a rotational drive output at the front end of the engine 10 while the LP compressor drive shaft 23 provides a rotational drive output at the rear end of the engine 10. As shown in FIG. 1, the LP turbine shaft 25 can be integral to the HP turbine 21. However, the LP compressor drive shaft 23 is provided as removable shaft to facilitate on-wing hot section inspection (HSI). As will be seen hereinafter, the power transmitting shaft architecture of the engine is designed to allow the LP compressor drive shaft 23 to be axially removable from the engine 10 through the center of the LP turbine shaft 25 and the propeller shaft 16.

In light of the preceding, it can be appreciated that the LP turbine 21 drives both the rotatable load (e.g. the propeller) and the LP compressor 22. Furthermore, the rotatable load, when mounted to the engine 10, and the LP compressor 22 are disposed on opposite ends of the LP turbine 21. It can thus be appreciated that one or more low pressure turbine stages are used to drive elements in front of the LP turbine (e.g. propeller, RGB 31, etc.) as well as to drive elements to the rear of the LP turbine (e.g. LP compressor 22). This configuration of the LP turbine 21 allows it to simultaneously drive the rotatable load and the LP compressor 22.

Referring concurrently to FIGS. 1 to 4, it can be appreciated that the LP compressor drive shaft 23 extends axially from an output end of the RBG 31, through the LP turbine shaft 25, the LP turbine 21, the HP spool 40 to a LP compressor cavity 80 on a downstream side of the LP compressor 22 where the LP compressor drive shaft 23 is drivingly coupled to an LP compressor gear train input shaft 23b via axially extending splines 27. The LP compressor gear train input shaft 23b extends centrally through the LP compressor 22 to a location aft of the LP compressor 22 for connection with a set of gears 62 which, in turn, provides a drive output to an LP compressor input shaft 74 extending integrally rearwardly from the LP compressor 22, as will be discussed in greater details herein below.

As shown in FIG. 4, the LP compressor drive shaft 23 may extend axially into LP compressor gear train input shaft 23b to provide a male/female spline coupling. However, other coupling arrangements allowing axial withdrawal of the LP compressor drive shaft 23 through the front end of the engine 10 are contemplated as well. According to a non-illustrated embodiment, the LP compressor drive shaft 23 could be directly coupled via axially oriented splines or the like to the LP compressor 22.

As shown in FIG. 3, the LP compressor drive shaft 23 is drivingly coupled to the LP turbine shaft 25 via axially extending splines 29. In this way, a driving torque can be transferred from the LP turbine 21 to the LP compressor 22. In the illustrated embodiment, axially extending teeth projecting from the outer surface of the LP compressor drive shaft 23 are in meshing engagement with a corresponding row of teeth projecting from the inner surface of the LP turbine shaft 25. A retaining nut 31 is threadably engaged with a corresponding inwardly threaded portion at a front distal end of the LP turbine shaft 25 for releasably preventing axial withdrawal of the LP compressor drive shaft 23 from the LP turbine shaft 25. The nut 33 has external threads 33a for engagement with corresponding internal threads on the LP turbine shaft 25. Withdrawal of the LP compressor drive shaft 23 is prevented by an inner annular flange 33b projecting radially inwardly from the nut 33 for axially blocking the passage of the LP compressor drive shaft 23 out of the LP turbine shaft 25. It is understood that nut 33 could be replaced by other suitable fasteners for selectively limiting axial movement of the LP compressor drive shaft 23 relative to the LP turbine 21 and the LP compressor 22.

Referring back to FIG. 1, the HP spool 40 has at least one component to compress the air that is part of the compressor section 12, and at least one component to extract energy from the combustion gases that is part of the turbine section 14. The HP spool 40 is also disposed along the engine axis 17 and includes a HP turbine 41 (also referred to as the compressor turbine) drivingly engaged (e.g. directly connected) to an HP compressor 42 by an HP shaft 43 surrounding the LP compressor drive shaft 23 and rotating independently with respect thereto. In the illustrated embodiment, the HP shaft 43 is a hollow shaft which rotates around the LP compressor drive shaft 23. That is the LP compressor drive shaft 23 extends axially through the HP shaft 43. The HP turbine 41 and the HP compressor 42 may include one or more stages of rotors, depending upon the desired engine thermodynamic cycle, for example. In the depicted embodiment, the HP compressor 42 includes a centrifugal compressor 42a or impeller and an axial compressor 42b, both of which are driven by the HP turbine 41. During operation of the engine 10, torque is transferred from HP turbine 41 to the HP compressor 42 via HP shaft 43.

In the exemplified reverse flow engine configuration, the HP turbine 41 is aft of the LP turbine 21, and forward of the combustor 13. The HP compressor 42 is aft of the combustor 13, and forward of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41. This arrangement provides for a boosted reverse flow engine.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10. The transfer of compression work from the HP compressor 42 to the LP compressor 22 contrasts with some conventional reverse-flow engines, in which the high pressure compressor (and thus the high pressure turbine) perform all of the compression work.

In light of the preceding, it can be appreciated that the LP turbine 21 is the "low-speed" and "low pressure" turbine section when compared to the HP turbine 41. The LP turbine 21 is sometimes referred to as the "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22.

The HP turbine 41 and the HP compressor 42 can have any suitable mechanical arrangement to achieve the above-described split compressor functionality. For example, and as shown in FIG. 1, the HP shaft 43 extends concentrically about the LP compressor drive shaft 23 and is independently rotatable relative thereto. The relative rotation between the HP shaft 43 and the LP compressor drive shaft 23 allow the shafts 23, 43 to rotate at different rotational speeds, thereby allowing the HP compressor 42 and the LP compressor 22 to rotate at different rotational speeds. The HP shaft 43 can be mechanically supported by the LP compressor drive shaft 23 using bearings (or the like) or be independently supported from one another.

The engine 10 is periodically inspected to identify worn parts. For instance, hot section inspections (HSI) are periodically performed. At least some of the characteristics of the above described LP shaft architecture may facilitate the assembly and disassembly of the power section from the engine to permit replacement or inspection of hot section components. For instance, for a turboprop engine incorporating the above described LP compressor drive shaft construction, an HSI procedure may be facilitated by removing the LP compressor drive shaft 23. To do so, the propeller (not shown) is first removed from the propeller shaft 16. According to one embodiment, removing the propeller may include removing a center plug 16a from the central passage extending axially through the propeller shaft 16 to provide access to the LP compressor drive shaft 23, which is coaxial to the propeller shaft 16. The LP compressor drive shaft 23 may then be axially "unlock" or "free" to permit subsequent withdrawal thereof through the propeller shaft 16. According to the illustrated exemplary embodiment, axially unlocking the LP compressor drive shaft 23 comprises untightening retaining nut 33 and removing it from the LP turbine shaft 25 via the axially extending passage of the propeller shaft 16. Once the retaining nut 33 has been removed from the engine via the passage in the propeller shaft 16, the LP compressor drive shaft 23 can be axially extracted centrally through the propeller shaft 16. The LP compressor drive shaft 23 is uncoupled from the LP compressor 22 and the LP turbine 21 by axially pulling on the shaft 23 so as to cause the axially extending splines 27, 29 at opposed ends of shaft 23 to come out of engagement with the mating splines of the LP turbine shaft 25 and the boost gear shaft 23b. Thereafter, the power section module, including the LP turbine 21, the exhaust case 15, the RGB 31 and the propeller shaft 16 can be detached from the remainder of the engine at flange 61. For wing mounted engines, a crane and harness arrangement is typically used to remove the power section module. The remainder modules of the engine remain attached to the aircraft wing, thereby allowing for on-wing inspection of the engine. The removal of the LP compressor drive shaft 23 prior to disassembly of the power section module from the engine facilitate the disassembly operation as compared to engines having non-removable shafts, which remain attached to the engine cold sections (e.g. the LP compressor) when the hot power section modules are removed.

Still referring to the embodiment shown in FIG. 1, the engine 10 may also include an accessory gearbox (AGB) 50. The AGB 50 receives a rotational input from the HP spool 40 and, in turn, drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs.

According to the illustrated embodiment, the AGB 50 is concentrically mounted axially aft of the LP compressor 22 as an axial extension of the engine envelope. The axial positioning of the AGB 50 allows minimizing the overall radial envelope of the engine as compared to a split compressor or boosted engine having the AGB mounted on a radially outer surface of the engine envelope and connected to the HP spool via a tower shaft. In the illustrated embodiment, the AGB 50 is accommodated within the envelope of the engine in a plane normal to the central axis 17.

In the illustrated embodiment, the AGB input drive axis is coaxial to the LP compressor centerline and, thus, the engine axis 17. By so aligning the input axis of the AGB 50 relative to the LP compressor centerline, the drive input to the AGB 50 can be provided centrally through the LP compressor 22, thereby eliminating the need for a tower shaft and an externally mounted gear arrangement. However, unlike conventional reverse flow engines (like the well-known PT6 engine manufactured by Pratt & Whitney Canada), which do not include a compressor boost, the presence of the LP compressor 22 axially between the HP compressor 42 and the AGB 50 physically interferes with the connection of the AGB 50 with the HP spool 40, which is disposed on the opposed axially facing side of the LP compressor 22. In the illustrated embodiment, this particular problem is overcome by extending the HP shaft 43 through a central bore or passage in the LP compressor 22. The HP shaft 43 thus provides a drive input to the AGB 50 coaxial to the engine axis 17. According to the embodiment illustrated in FIGS. 1-3, the HP shaft 43 is segmented between the HP compressor 42 and the LP compressor 22 to allow for the introduction of a bearing 52 to provide support to the LP shaft 23 between the HP compressor 42 and the LP compressor 22. A gear 54 is provided to drivingly couple the HP shaft 43 to an AGB drive input shaft 43b, which may also be viewed as being an extension (i.e. a segment) of the HP shaft 43. The gear 54 may be provided in the form of a bevel gear having a 1:1 speed ratio. The bevel gear may be set to have a rotation axis perpendicular to the rotation axis of the HP shaft 43. Such a gear arrangement allows for the installation of a support and bearing structure for supporting the LP compressor drive shaft 23. Such a support may be suitable when the LP compressor drive shaft 23 is provided in the form of a one-piece shaft or in order to address specific shaft dynamic requirements.

The AGB input shaft 43b projects axially into the AGB 50 and is provided at a distal end thereof with a gear 56, which is in meshing engagement with an associated AGB output gear 58. In the illustrated example, the AGB output gear 58 has a rotation axis parallel to the engine axis 17. The output gear 58 is drivingly connected to accessories (not shown). It is understood that the accessories gear train in the AGB 50 can adopt various configurations, including multiple outputs and different gear ratios.

Referring to FIG. 1, it can be appreciated that the LP compressor or boost gear train 62 may be integrated to the AGB 50 to drivingly couple the LP compressor drive shaft 23 and, thus, the LP turbine 21 to the LP compressor 22. As mentioned herein above, the gear connection between the LP turbine 21 and the LP compressor 22 is advantageous in that it allows driving the LP compressor 22 at a different speed than the LP turbine 21. It can thus allow for overall thermodynamic cycle performance improvement.

The LP compressor gear train 62 comprises an input gear 60 provided at the distal end portion of input shaft 23b, the end portion which projects outwardly of the HP shaft 43. The input gear 60 is in meshing engagement with a second gear 66 mounted at an aft end of a transfer shaft 68 having a rotation axis parallel to the engine axis 17. A third gear 70 is provided at an opposed forward end of the transfer shaft 68 for meshing engagement with a fourth gear 72 provided at the distal end of the LP compressor input shaft 74. As shown in FIG. 1, the LP compressor input shaft 74 is a hollow shaft extending concentrically about the HP shaft 43, 43b. The LP compressor input shaft 74 ends at a location forward of the shaft 43b, to thereby allow the HP shaft 43 to be drivingly connected to gear 58. It can be appreciated that the relative lengths of shafts 23b, 43b, 74 projecting into the AGB 50 allows for the various gear connections (the innermost shaft having the deepest AGB penetration).

The boost gear train 62 can adopt various configurations and is, thus, not limited to the single gear train architecture shown in FIGS. 1 and 2. For instance, the gear train 62 could be provided as a dual gear train to provide first and second drive inputs to the LP compressor 22. The dual gear train 62 could comprise first and second sets of gears provided on opposed lateral sides of the LP compressor gear train input shaft 23b and drivingly connected to the same input gear 60.

The positioning of the gear train 62 at the aft end of the engine in a common housing with the AGB 50 contributes to facilitate the engine assembly and eliminate the need for a separate casing and lubricating structure for the boost gear train 62. One containment and lubricating system can be used for both the AGB gears 56, 58 and the boost gear train 62. Such an integration of the AGB and the boost gear train in a common casing facilitates the access to the gears for adjustment purposes while minimizing part counts. However, it is understood that the boost gear train 62 could be provided as a separate unit on the AGB facing side of the LP compressor 22 and, thus, axially aft of the LP compressor 22 in a reverse flow engine configuration. The fact the boost gear train 62 has a drive input coaxial to the engine axis 17 also provides for a compact geared engine arrangement while at the same time contributing to ease the assembly process.

In the embodiment illustrated in FIG. 1, the case of the air inlet forms part of the AGB 50 and boost gear train 62 housing. However, it is understood that the AGB and the boost gear train 62 could be packaged as a stand-alone unit.

As can be appreciated from FIG. 1, the gear 54 and the bearing 52 are housed in an internal cavity 80 radially inwardly of the gaspath 18 between the HP compressor 42 and the LP compressor 22. The internal cavity 80 is bounded by the compressor inner gaspath wall 82. The internal cavity 80 communicates with the AGB 50 via the central bore extending axially through the LP compressor 22, thereby providing for a combined bearing/gear train oil chamber. Access to the gear 54 and bearing 52 may be provided by a split casing assembly including first and second separable casing sections having an interface axially between the HP compressor 42 and the LP compressor 22.

It can thus be appreciated that at least some of the embodiments of the engine 10 disclosed herein provide a mechanical architecture of turbomachinery that allows for a split compressor system in a compact PT6 type configuration. Such a split compressor engine in a reverse flow or through flow configuration may be used for aircraft nose installations, as well as for wing installations. The boost gear train 62 eliminates the need for a tower shaft for connecting the AGB 50 to the HP spool 40. Indeed, with this engine architecture, the HP shaft can be axially directly connected to the AGB, the AGB having an input axis coaxial to the engine axis 17. In this way no shaft has to be passed across the gaspath to drivingly connect the HP spool 40 to the AGB 50, thereby avoiding performances losses. The compressor aerodynamics can be improved by eliminating the service strut typically used to pass the tower shaft. The engine weight may be reduced by eliminating the need of an upstream transfer case. The position of the hardware used to build the gear trains may be designed for an optimal clearance from the LP rotor center. It can also be appreciated that at least some embodiments allow locating the AGB along the engine centerline aft of the LP compressor. This may provide installation benefits, reduce cost and weight relative to an externally mounted tower shaft driven AGB.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A boosted reverse flow gas turbine engine comprising:
a low pressure (LP) spool and a high pressure (HP) spool rotatable independently of one another about an engine axis;
the LP spool comprising a LP turbine, a LP compressor disposed aft of the LP turbine relative to a direction of forward travel of the engine, a LP compressor drive shaft drivingly connecting the LP turbine to the LP compressor, and a hollow LP turbine shaft projecting axially forward from the LP turbine and drivingly connected to the LP turbine for driving a rotatable load; the LP compressor drive shaft being coaxial to the hollow LP turbine shaft and axially removable through the hollow LP turbine shaft.

2. The boosted reverse flow gas turbine engine defined in claim 1, further comprising a hollow propeller shaft coaxial to the hollow LP turbine shaft and drivingly connected thereto, the LP compressor drive shaft being axially insertable/removable through the hollow LP turbine shaft and the hollow propeller shaft.

3. The boosted reverse flow gas turbine engine defined in claim 2, wherein the hollow propeller shaft is drivingly connected to the hollow LP turbine shaft via a reduction gearbox (RGB), the hollow propeller shaft extending forwardly from the RGB.

4. The boosted reverse flow gas turbine engine defined in claim 2, wherein the hollow propeller shaft and the hollow LP turbine shaft are coaxial and jointly define a central passage along the engine axis, the LP compressor drive shaft being axially movable through said central passage, axially extending splines drivingly coupling the LP compressor drive shaft to the LP turbine and the LP compressor.

5. The boosted reverse flow gas turbine engine defined in claim 1, wherein a retaining nut is threadably engaged with a forward end of the hollow LP turbine shaft to prevent axial withdrawal of the LP compressor drive shaft from the hollow LP turbine shaft.

6. The boosted reverse flow gas turbine engine defined in claim 5, further comprising a hollow propeller shaft coaxial to the hollow LP turbine shaft and drivingly coupled to the hollow LP turbine shaft, the hollow propeller shaft extending forward of the hollow LP turbine shaft, the retaining nut being accessible via a central passage extending axially through the hollow propeller shaft.

7. The boosted reverse flow gas turbine engine defined in claim 1, wherein the LP compressor drive shaft is drivingly coupled to the LP turbine and the LP compressor via axially extending splines.

8. The boosted reverse flow gas turbine engine defined in claim 1, wherein the HP spool comprises a HP turbine, a HP compressor and a HP shaft drivingly connecting the HP turbine to the HP compressor, the HP compressor disposed forward of the LP compressor and in fluid communication with the LP compressor, the HP turbine disposed aft of the LP turbine and in fluid communication with the LP turbine.

9. A turboprop engine comprising:
a propeller shaft rotatable about an engine axis; a low pressure (LP) turbine shaft rotatable about the engine axis and drivingly coupled to the propeller shaft;
a LP turbine drivingly connected to the LP turbine shaft;
a LP compressor drive shaft rotatable about the engine axis and drivingly coupled to the LP turbine; and
a LP compressor drivingly coupled to the LP compressor drive shaft, the LP turbine disposed axially between the propeller shaft and the LP compressor;
the LP compressor drive shaft being removable from the engine through a central passage extending axially through the propeller shaft and the LP turbine shaft.

10. The turboprop defined in claim 9, wherein the LP turbine, the LP compressor, the LP compressor drive shaft and the LP turbine shaft form part of a LP spool, and wherein the turboprop engine further comprises a high pressure (HP) spool rotatable about the engine axis independently of the LP spool, the HP spool comprising a HP turbine, a HP compressor, and a HP shaft drivingly connecting the HP turbine to the HP compressor, the HP compressor disposed downstream of the LP compressor and being in fluid communication with the LP compressor, the HP turbine disposed upstream of the LP turbine and in fluid communication with the LP turbine.

11. The turboprop engine defined in claim 9, wherein axially extending splines drivingly couple the LP compressor drive shaft to the LP turbine and the LP compressor.

12. The turboprop engine defined in claim 11, wherein the LP compressor drive shaft extends axially through the LP turbine shaft.

13. The turboprop engine defined in claim 9, wherein a reduction gearbox (RGB) drivingly couples the LP turbine shaft to the propeller shaft, the LP compressor drive shaft extending axially through the RGB.

14. The turboprop engine defined in claim 9, wherein a retaining nut releasably prevents axial withdrawal of the LP compressor drive shaft from the LP turbine shaft, and wherein the retaining nut is accessible via the central passage extending through the propeller shaft.

15. A method of removing a shaft from a turboprop engine having a low pressure (LP) compressor drivingly coupled to a LP turbine via a LP compressor drive shaft wherein the LP compressor is axially aft of the LP turbine, the LP turbine drivingly coupled to a propeller shaft of a propeller, the method comprising: removing the propeller from the propeller shaft, the propeller shaft defining an axially extending passage providing access to the LP compressor drive shaft, axially unlocking the LP compressor drive shaft, and axially extracting the LP compressor drive shaft through the axially extending passage of the propeller shaft.

16. The method defined in claim 15, wherein axially unlocking comprises accessing, via the axially extending passage, a retaining nut and untightening the retaining nut.

17. The method defined in claim 16, wherein the LP turbine has a hollow LP turbine shaft coaxial to the propeller shaft and drivingly coupled to the propeller shaft, the LP compressor drive shaft being received in said LP turbine shaft, and wherein untightening the retaining nut comprises untightening the retaining nut from a distal end of the LP turbine shaft.

18. The method defined in claim 15, wherein the LP compressor drive shaft is axially unlocked from the LP turbine.

19. A method of conducting a hot section inspection (HSI) comprising: detaching a power section module of the turboprop engine from a remainder of the engine after having removed the LP compressor drive shaft from the turboprop engine as defined in claim 15, and then inspecting hot section engine components.

* * * * *